United States Patent [19]

Palmaer

[11] Patent Number: 5,573,105
[45] Date of Patent: Nov. 12, 1996

[54] RADIUS CONVEYOR WITH GUIDE ROLLERS

[76] Inventor: Karl V. Palmaer, 6525 Puerto Dr., Rancho Murietta, Calif. 95683

[21] Appl. No.: 555,317

[22] Filed: Nov. 8, 1995

[51] Int. Cl.⁶ .................................................. B65G 17/06
[52] U.S. Cl. ........................................ 198/853; 198/845
[58] Field of Search ................................. 198/778, 845, 198/850, 851, 852, 853

[56] References Cited

U.S. PATENT DOCUMENTS

| | | | |
|---|---|---|---|
| 3,738,478 | 6/1973 | Tourtellotte | 198/853 X |
| 3,854,575 | 12/1974 | Fraioli, Sr. | 198/853 X |
| 3,865,229 | 2/1975 | Velander | 198/845 X |
| 3,880,276 | 4/1975 | Willett, III | 198/853 X |
| 4,153,152 | 5/1979 | LaPeyre | 198/852 X |
| 5,127,515 | 7/1992 | Damkjaer | 198/853 X |
| 5,224,583 | 7/1993 | Palmaer et al. | 198/853 X |
| 5,429,227 | 7/1995 | Krossmann et al. | 198/852 |

*Primary Examiner*—James R. Bidwell
*Attorney, Agent, or Firm*—Thomas M. Freiburger

[57] ABSTRACT

A plastic modular conveyor belt of the type having slotted openings in one set of projections for allowing collapse of the inner side of the belt in travel around curves includes a guide roller on the underside of the belt. The guide roller, with a low-friction bearing, smoothly guides the belt so that contact is avoided at the inner side belt edge. In some preferred embodiments the guide roller can also serve as a hold down for the belt around curves, by engaging upwardly against a guide strip. In another embodiment separate hold down tabs are included, so that the roller serves only a guiding function.

12 Claims, 3 Drawing Sheets

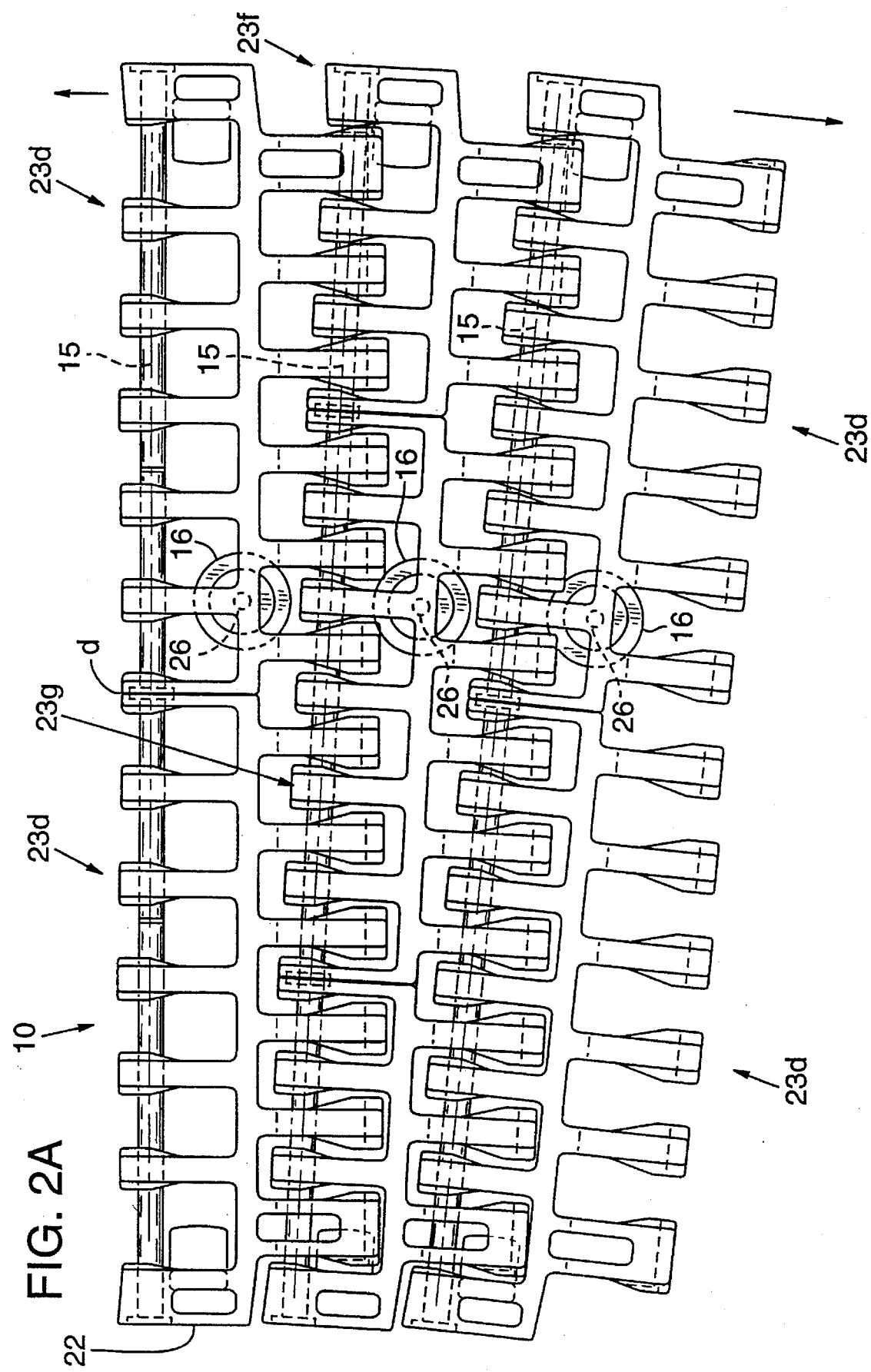

RADIUS CONVEYOR WITH GUIDE ROLLERS

BACKGROUND OF THE INVENTION

This invention relates to modular plastic conveyor belts, and more specifically to a radius type modular conveyor belt adapted to travel around lateral curves, and to a means for guiding the belt smoothly around curves.

U.S. Pat. Nos. 4,742,907 and 5,181,601 of KVP Systems, Inc. disclose modular plastic conveyor belts of the type with which this invention is concerned. Those conveyor belts are adapted to travel around lateral curves and have front and rear link ends or projections on each module, one set of which is slotted to allow collapse at the inner sides of curves. Both patents show guide members for guiding the belt around the outside of a curve, or at an intermediate position spaced outwardly from the inside of the curve, to promote smooth travel around the curve without bunching or vibration which might occur if the belt made contact with the stationary structure at the inside of the curve.

Robertson U.S. Pat. No. 5,224,587, shows a guide structure for generally the same type of modular conveyor belt, the guide being positioned to extend down from the center of the belt module. The guide structure of that patent, an inverted T-shape, was intended to act via the inner side of the T structure to both guide the belt and to hold the belt from pulling upwardly when travelling around a curve.

Other modular belts shown in patents have utilized guide members and hold down tabs of the general type described above. For example, see Horton U.S. Pat. No. 5,372,248.

Guide rollers have been used previously on other types of conveyors wherein different considerations and different structures were involved. See, as examples, U.S. Pat. Nos. 1,884,112, 3,117,668, 3,185,108, 3,214,007, 3,627,109, 3,788,447, 3,808,921, 3,854,575, 3,910,404, 3,951,256, 3,952,860, 4,179,025., 4,555,014, 4,645,070, 4,893,709, 5,076,422 and 5,174,436.

Of the above patents, U.S. Pat. No. 3,185,108 shows a pedestrian carrier which has a central roller to guide articulated platform segments, arcuate at their front edges, around very sharp U-turn curves. The solid conveyor platform segments, similar to those of a baggage conveyor in an airport baggage claim area, are very different from the rod-connected, interdigited plastic modules of this invention, which collapse together at the inner side around curves. Roller arrangements similar to that of U.S. Pat. No. 3,185,108 are also shown in other patents, but they are not shown in connection with modular belts in which virtually all longitudinal belt tension is carried in the outside edge of the belt during travel around curves, where belt guidance is critical.

U.S. Pat. Nos. 3,854,575 and 3,951,256 show radius type conveyor belts, generally of fixed radius and without linear travel, such as following a quarter-circle of travel and returning below over the same quarter-circle. Cone-shaped end rollers supported the generally fixed-radius belts. The belts in those patents were guided at their outer edges or inwardly thereof by rollers on vertical axes. In these types of belts different considerations are involved from those of a belt of the type with which this invention is concerned. Spiral conveyors have employed guide rollers, but again in a belt arrangement presenting very different considerations.

U.S. Pat. No. 4,645,070 shows a radius conveyor, but one which actually comprises a central chain with an attached wide top plate. In one embodiment the chain is guided by rollers on vertical axes.

It is an object of this invention to provide improved guiding and holding down structure for a modular plastic conveyor belt of the radius type, for guiding the belt in a smooth, low-friction and efficient manner around curves.

SUMMARY OF THE INVENTION

In accordance with this invention, a modular plastic conveyor belt of the type adapted to travel around horizontal curves, with provision for collapse of the modules together at the inner side of a curve, has low-friction guide rollers positioned preferably centrally and extending downwardly from the lower side of the belt module. Each module preferably has such a guide roller, with the roller located at a similar position on each module such that the rollers all follow a common path as the conveyor belt travels.

In one preferred embodiment the rollers are stepped in cross section, with an upper smaller diameter and a lower larger diameter. This form of roller cooperates with a fixed roller guide at curving portions of the belt to not only provide for smooth, low-friction travel of the belt around the curve, holding the inner edges of the belt from any contact with stationary structure at the inside of the belt, but also cooperating with a ledge on the fixed roller guide to hold the belt down against its tendency to pull upwardly due to the tension on the curve.

The guide roller may be of nylon or other low-friction plastic material, journaled for rotation on a vertically disposed post or spindle material which exhibits low friction with the material of the roller itself. A low-friction bushing may be interposed between the spindle and the central opening of the roller. Similarly, the fixed roller guide rail, in the embodiment wherein it provides a hold down function in cooperation with the roller, is of a plastic material which exhibits low friction with the material of the roller, since the roller makes upward sliding contact with the guide rail ledge. Some examples of plastics which may be used are acetal, olefin and UHMW polyethylene.

In one disclosed embodiment the roller structure may be secured to a plastic conveyor belt module simply by a screw tapped into a bore in the bottom side of the plastic module structure. Around the extending portion of the screw is a sleeve of material having a low friction relationship with the material of the actual roller, immediately surrounding the sleeve. In another form of the roller structure, the belt module has an integrally formed, downwardly extending post which supplies support for the roller. The low-friction bearing for the roller in this case can comprise a plastic sleeve or bushing surrounding the integral post extending from the module, the surfaces subject to roll contact having a very low-friction relationship, as above. The integral spindle or post may have a snap-on feature formed by a split along its length and a barb shape at its end, so that on assembly of the guide roller, the roller may be forced over the barb and onto the shank of the post, with the barbed end snapping to an expanded normal position on assembly of the roller to thereby lock the roller in place.

Modular plastic conveyor belts of the type with which this invention is concerned, adapted to follow both straight and curving paths, are supported for movement on stationary wear strips, the belts being slidable on the wear strips. By selection of materials, attempts are made to minimize the sliding friction between the bottom surfaces of the conveyor belt and the wear strips. Another element of friction, addressed by this invention, is encountered in travel around curves. The belt in traversing a curve must be guided around the curve in some manner, either by a wear strip or other guiding surface positioned for contact by the inside edge of the belt, or by guide members as disclosed in U.S. Pat. No. 4,742,907, those guide members being positioned outwardly of the inside of the curve, generally between the center of the belt and the outside of the belt as it travels around a curve. The advantages of guiding a belt using such guide members are described in U.S. Pat. No. 4,742,907. Although the guide members as disclosed in that patent tend to reduce friction of the belt in travel around curves, as well as providing a more orderly and efficient guide system for the belt, there is still a significant element of friction in radius travel. The system of this invention addresses the curve friction in a belt of the type described, and dramatically reduces such friction by guiding the curving belt using a series of low-friction rollers.

There is a distinct benefit in such a reduction of friction. Friction of the belt, both with the wear strips supporting the belt and at the guidance devices which guide the belt around the curve, creates tension loading in the belt and thus imposes a limitation on the length of the belt, for a given maximum loading of conveyed materials. Stated another way, such friction imposes a limitation on the permissible loading (weight) of conveyed material on top of the belt, for a given length of belt. Any reduction in friction enables a longer effective conveying length for the belt, a heavier loading of conveyed materials on the belt, or the use of lighter or lower-strength plastic module components, for a given length and desired loading on the belt.

It is therefore among the objects of the invention to reduce friction encountered in travel around curves in radius type plastic modular conveyor belts, with the result that a given belt can serve heavier duty use. This is accomplished through a series of low-friction guide rollers connected to the bottoms of belt modules on vertical axes extending downwardly generally at the center of the belt modules. These and other objects, advantages and features of the invention will be apparent from the following description of a preferred embodiment, considered along with the accompanying drawings.

DESCRIPTION OF THE DRAWINGS

FIG. 2A is a plan view showing a belt segment travelling around a curve, the outside of which is on the right in the drawing.

DESCRIPTION OF PREFERRED EMBODIMENTS

Figure 1:
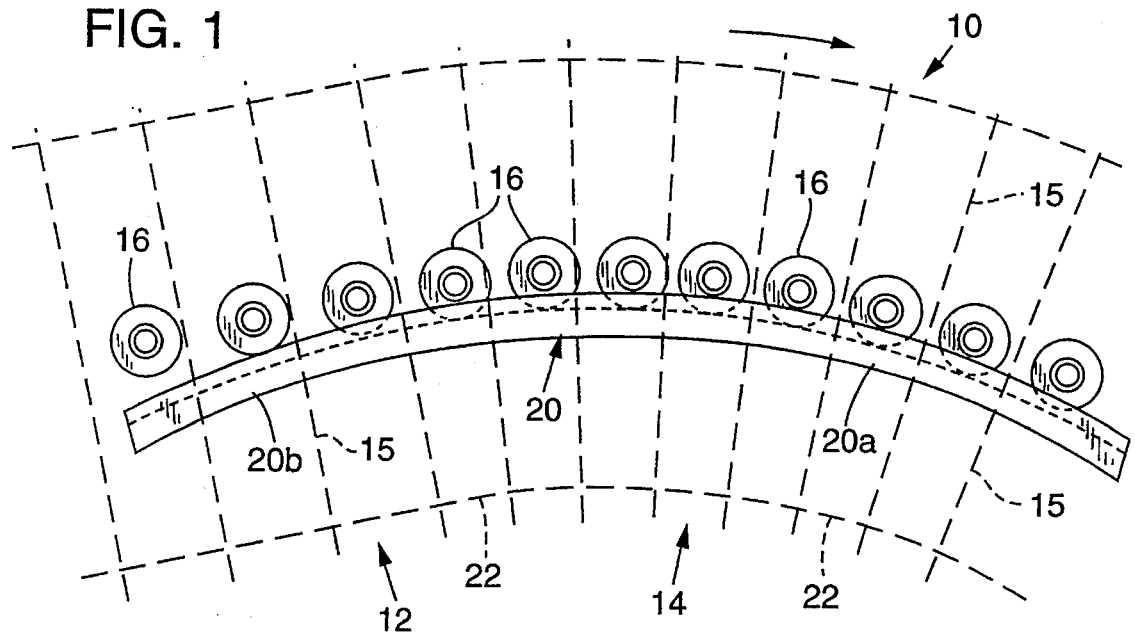
FIG. 1 is a plan view schematically indicating a radius type plastic modular conveyor belt of the type with which the invention is concerned, fitted with a series of low-friction rollers which engage against a fixed roller guide structure in travel around a curve.

FIG. 1 shows in schematic outline form a radius type conveyor belt 10, including a linear portion 12 which transitions into a horizontal curving section 14. The conveyor belt 10 is a modular plastic conveyor belt, generally of the type disclosed in U.S. Pat. No. 4,742,907, with modules having sets of projections or link ends extending in forward and rearward directions, one set of the projections having slotted rod receiving openings so as to facilitate the collapse of the belt around the inside of a curve, as illustrated in FIG. 1. FIG. 1 does not show the projections but indicates the outline of the belt and includes dashed lines 15 indicating generally connecting rod locations wherein the interdigited projections are connected.

FIG. 1 also shows a series of low-friction guide rollers 16 aligned along a common path in the conveyor belt, preferably one such roller being secured to each of the serially connected belt modules. As indicated, the guide rollers in the linear portion of the belt 12 preferably do not have contact with any surface since none is needed; however, as they approach and enter the radius portion 14 of the belt, they converge upon a fixed roller guide structure or guide rail 20 which transitions into a position as shown wherein the rollers 16 bear against the roller guide structure 20 to guide the belt, i.e. to hold the belt modules along a desired path, such that its inner edge 22 on the curve does not contact any fixed structure as the belt traverses the curve. Once the belt modules pass through the radius portion or curving section 14 of the curve and re-enter a linear path, not shown, the rollers again depart from contact with the roller guide structure, which preferably does not continue into such linear portion of the belt. The roller guide rail 20 thus has an operative portion 20a which is preferably arcuate and centered on the same center as the curving belt section 14; and a lead-in portion 20b overlapping into the straight portion of the belt as shown. This latter portion 20b may simply be a continuation of the arc of the operative portion 20a.

Figure 2:
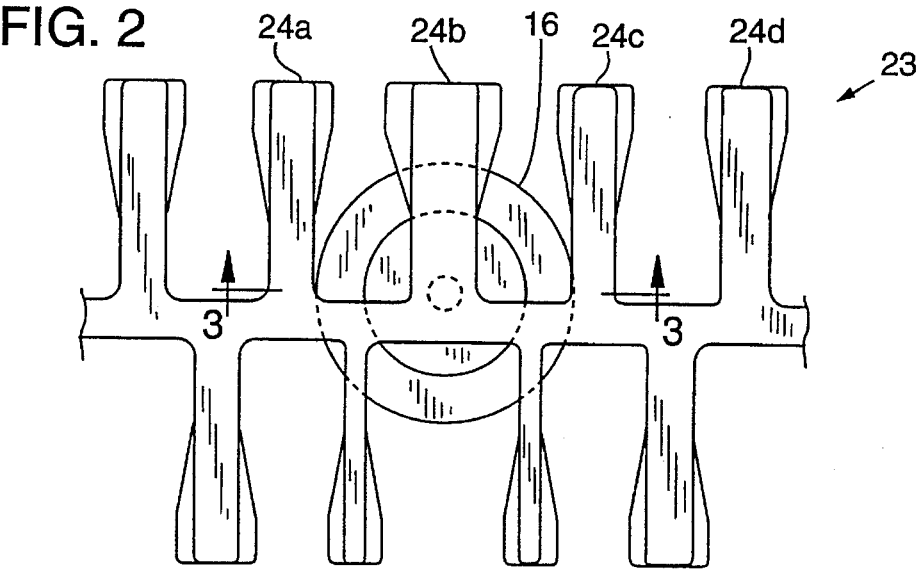
FIG. 2 is a more detailed plan view showing a portion of a conveyor belt module and indicating a low-friction roller secured to the bottom side of the module.

FIGS. 2 though 5 show details and alternative structures of the guide rollers 16 and the manner in which they are secured to the belt modules.

In FIGS. 2 and 2A a plastic conveyor belt module 23 of the type shown in U.S. Pat. Nos. 5,419,428 and 4,742,907 is shown, in top plan view, with a guide roller 16 secured rotatively to the bottom side of the module. This is also shown in the sectional view of FIG. 3. In the module 23 illustrated, the sizes of projections or link ends 24a, 24b, 24c, etc. vary somewhat from projection to projection, and the guide roller 16 may advantageously be secured at the location of a relatively wide projection 24b as in FIG. 2, for maximum strength in the structural arrangement illustrated in FIGS. 2 and 3. It should be understood that the roller can be secured by this same structural arrangement on a belt module wherein all projections or link ends are of equal size, provided adequate structure is present.

FIG. 2A shows the rollers 16 on a belt 10 which is composed of rows of modules 23d (two per row) alternating with rows of modules 23f and 23g (three per row). In this case the guide rollers 16 may be offset from center as illustrated, since a division d occurs at center in the two-module rows.

Figure 3:
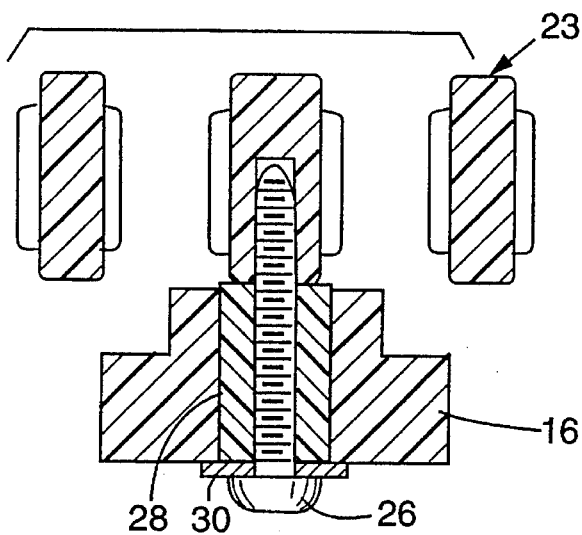
FIG. 3 is a sectional elevation view as seen along the line 3—3 in FIG. 2, showing part of the width of a module and showing one form of structure for retaining a low-friction guide roller in place on a belt module.

By the securing arrangement illustrated in FIGS. 2 and 3, a machine screw 26 retains the roller 16 on the bottom of the belt module, by means of a bushing 28 and a washer 30. The screw 26 may be threaded into a tapped hole in the module, or a self-tapping screw can be used in a non-tapped hole. The bushing 28 makes a low-friction bearing with the internal wall of a bore through the guide roller 16. For example, the materials of the guide roller and the bushing may be acetal and nylon or HDPE (high density polyethylene), respectively, although many combinations of plastics will work well to produce a relatively low-friction bearing. Many known combinations of plastic materials, preferably combinations of dissimilar materials, may be used. Several thousandths of an inch clearance may be left between the confronting diameters. No lubrication is required. In this arrangement the guide roller also makes contact, although not under load, with the bottom surface of the belt module 23. The two plastics in this contact situation are also selected to provide for low friction sliding contact; the plastic module itself may be formed of polyethylene, polypropylene, nylon or other plastics.

Figure 4:
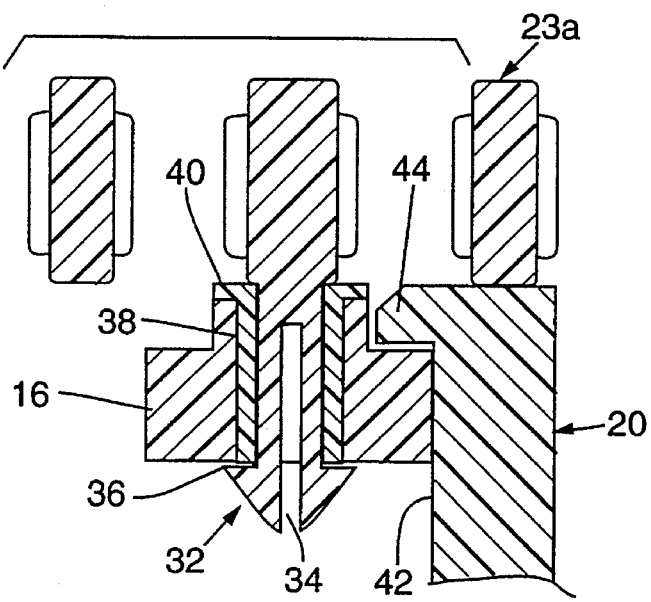
FIG. 4 is a sectional view in elevation, generally similar to FIG. 3, looking forward at a cutting plane through the modular conveyor belt, and showing another form of roller retention structure for holding a low-friction roller on a conveyor belt module, the belt being on a curve whose inside is toward the right, with a roller guide rail shown.

FIG. 4 shows a guide roller 16 in contact with a roller guide rail 20 such as shown in FIG. 1, guiding the belt around a curve, the inside of which is on the right in FIG. 4. Also, FIG. 4 shows a different structural arrangement for retention of the guide roller 16 on a belt module 23a. Here, a plastic post or spindle 32 is integrally molded with the plastic module 23a, extending downwardly from module structure, generally at the center of the module as shown. Although the guide roller 16 may be retained on the spindle 32 by means similar to what is shown in FIGS. 2 and 3, in the embodiment shown the post or spindle 32 has a split 34 as shown, or more preferably, a three-way division such that a barbed end 36 can be forced inwardly together at the splits when the roller guide, which may be accompanied by a cylindrical bushing 38, is pushed over the spindle. The assembly of the guide roller 16 onto the spindle springingly forces the plurality of sections of the barb end 36 inwardly, sufficient to accommodate the internal diameter of the guide roller or of the bushing 38, if included. As illustrated, the bushing 38 may also have a flat flange or annular portion 40 to provide for reduced friction at the sliding contact with the upper end of the guide roller (the bushing 28 of FIG. 3 may also include this). Again, materials of the guide roller 16 and the bushing 38 should be selected to minimize friction without requiring lubricant.

The roller guide structure or guide rail 20, which is fixed in position relative to the stationary frame or table on which the conveyor belt advances, is shown in FIG. 4 with a guiding surface or roller-engaging surface 42 facing toward the outside of the curve, and also a flange or ledge portion 44 which extends outwardly of the curve and overhangs the stepped-diameter roller guide 16 as shown. As discussed above, this provides a hold-down feature for the belt around curves, as well as serving as a guide for the belt around curves. The roller 16 is shown stepped in FIGS. 1, 2 and 3, commensurate with this purpose.

Figure 4A:
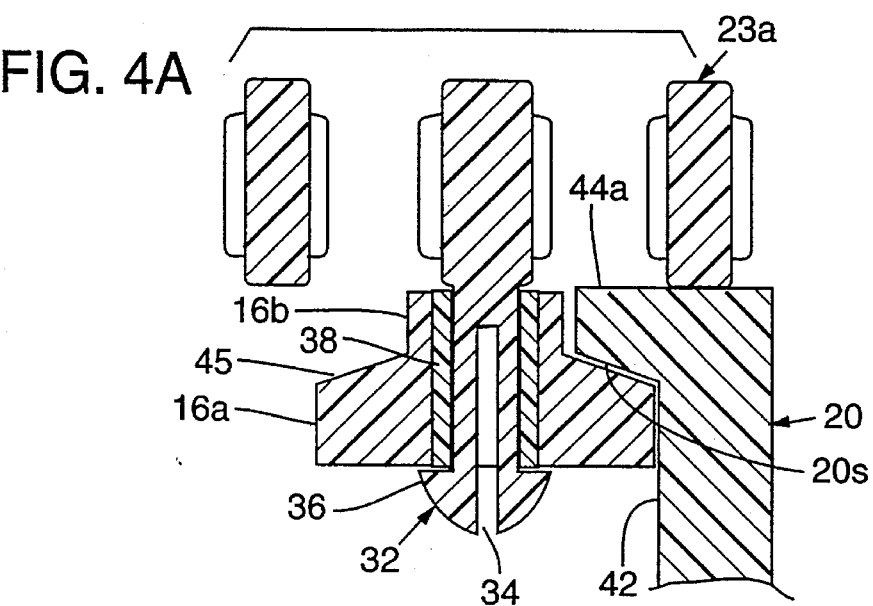
FIG. 4A is a sectional view similar to FIG. 4, but showing an alternate form of guide roller/rail structure. The embodiments of FIGS. 3, 4 and 4A combine a holding down function with the guiding function of the roller.

FIG. 4A illustrates a variation of what is shown in FIGS. 3 and 4. In FIG. 4A a guide roller 16a is generally stepped as in FIGS. 3 and 4, but has a sloping step surface 45, tapered downwardly/outwardly and shaped generally as a truncated cone. The roller 16a rolls against the guide rail 20 in the manner described relative to FIG. 4, but the holding down function is somewhat different. When the outside of the belt tends to pull upwardly under the tension of a curve, the sloping, conical surface 45 interacts with a sloped guide surface 20s as can be seen from the drawing. The surface 20s is the underside of an overhanging ledge or flange 44a, and has a slope complementary to the slope 45 of the roller. Preferably the larger and smaller diameters of the roller 16a are related to the size of the overhanging ledge 44a of the rail 20 such that the smaller diameter 16b will not contact the flange or ledge 44a. Therefore, when the belt is under tension on a curve, tending to pull upwardly, the guide rail 20 tends to pull the belt down to a greater extent depending on the belt tension tending to pull the modules 23a toward the inside of the curve. Again, either of the bushing arrangements shown in FIGS. 3 or 4 can be employed.

Figure 5:
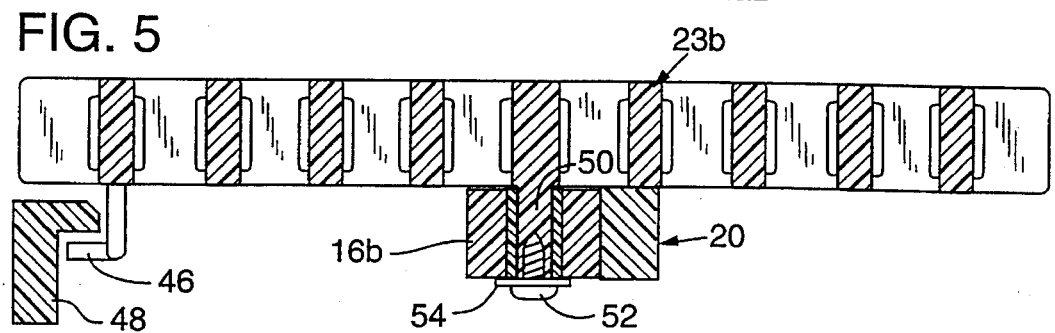
FIG. 5 is a sectional elevation view through the width of a belt, showing an alternative form of roller retention structure and of the roller itself, wherein the roller serves a guiding function and a separate hold down tab may be provided for retaining the belt against pulling up around curves. The inside of the curve is at the right in FIG. 5.

FIG. 5 shows an alternative embodiment of the invention wherein the guiding function is performed by a guide roller 16b, but the hold down function is accomplished by a separate hold down tab 46 which may be secured near the outer edge of the belt on a curve. As in U.S. Pat. No. 4,742,907, the hold down tab may be located anywhere between the outside of the curve and approximately the center of the belt, with a cooperating stationary member 48 appropriately located. The hold down tab 46 may extend inwardly or outwardly.

In the plastic belt module 23b shown in FIG. 5, any of the retention arrangements shown in FIGS. 2–4 and described above may be employed. FIG. 5 shows another alternative where a post or spindle 50 is again integrally molded with the plastic belt module 23b, but wherein a machine screw 52 is threaded into a tapped hole in the spindle to retain the roller 16b in place, with the help of a washer 54 (a self-tapping screw may be used).

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a plastic modular conveyor belt capable of following a path including straight and curving sections and including a series of connected and serially interdigited elongated molded plastic belt module rows being connected by rods extending transversely to the length of the conveyor belt, each belt module row having a set of first aligned spaced projections or link ends extending in one direction from the row and a set of second aligned spaced projections or link ends extending in an opposition direction, the first and second projections of serially adjacent module rows being longitudinally overlapping and juxtaposed when the modules are connected serially in the conveyor belt by the connecting rods extending through transverse openings in the projections, the transverse openings of one of said sets of spaced projections being longitudinally elongated slotted holes to accommodate lateral curves wherein the module rows become angularly shifted and collapse together at the inside of the curve, with substantially all longitudinal tension in the belt from module to module carried generally at the outside of a curve, and including stationary belt supporting structure supporting the belt for movement, the improvement comprising, a series of guide rollers mounted generally centrally on the undersides of at least some of the belt modules, with low-friction bearing means supporting the guide rollers on the modules, and a stationary roller guide rail secured to the stationary belt supporting structure, the roller guide rail being positioned through a curving section of the path of the conveyor belt and having a roller engaging surface which is spaced away from the inside edge of the belt so as to present a smooth surface for engagement by the series of guide rollers to maintain the belt modules on a prescribed curving path through the curving section, thereby providing for smooth and low-friction traversal of the curving section by the conveyor belt modules.

2. A plastic modular conveyor belt as defined in claim 1, wherein each curving section of the conveyor belt has a radius of curvature, and wherein the stationary roller guide rail has an operative portion extending through the curving section, the operative portion being substantially arcuate and centered on a common center with the curving section of the belt, and the roller guide rail having a lead-in portion, positioned in a straight section of the belt and leading into the curving section of the belt and to the operative portion of the roller guide rail, the lead-in portion being curved and having a lead end which is spaced away from the guide rollers, so that as the belt modules approach the curving section, the guide rollers gradually approach and smoothly contact said roller engaging surface of the roller guide rail.

3. A plastic modular conveyor belt as defined in claim 1, wherein the low-friction bearing means for the guide roller comprises a spindle extending downwardly from the belt module, with the guide roller having a central opening positioned over the spindle, and including means for retaining the guide roller on the spindle.

4. A plastic modular conveyor belt as defined in claim 3, wherein in the spindle has a barb-shaped end formed of a plurality of sections split from one another and capable of being compressed together inwardly, the barb-shaped end having a larger diameter than the opening through the guide roller, so that the roller may be assembled onto the spindle by pushing the roller over the barb-shaped end to compress together the barb-shaped end until the roller is fully assembled onto the spindle, at which point the barb-shaped end snaps open to a normal configuration, locking the roller in position on the spindle.

5. A plastic modular conveyor belt as defined in claim 4, wherein the spindle is integrally formed with the plastic belt module.

6. A plastic modular conveyor belt as defined in claim 4, further including a low-friction cylindrical bushing positioned in the central opening of the roller and over the spindle.

7. A plastic modular conveyor belt as defined in claim 1, wherein the guide roller is of a stepped shape, with an upper, smaller diameter and a lower, larger diameter, and wherein the roller guide rail has said roller engaging surface in position to be laterally engaged by the lower, larger diameter of the guide roller and an upper ledge of the guide rail extending toward the outside of the conveyor belt curve and toward said smaller diameter portion of the roller, overhanging the larger diameter portion, so that the larger diameter portion of the guide roller serves, in conjunction with the overhanging ledge, as a holding down structure for the belt in traversing a curve.

8. A plastic modular conveyor belt as defined in claim 1, wherein the guide roller and stationary roller guide rail include means for holding down the conveyor belt while travelling around a curve, resisting tendency of the belt to pull upwardly under belt tension in the curve.

9. A plastic modular conveyor belt as defined in claim 8, wherein the means for holding down the conveyor belt comprises each guide roller including a tapered, conical upper surface which slopes downwardly toward the outer edge of the roller, and the stationary roller guide rail including a generally complimentarily shaped upper ledge overhanging the tapered conical surface of the roller and having an inversely oriented slope which is generally the same as the slope of the roller, whereby tension in the belt in a curve which tends to pull the belt inwardly of the curve also tends to pull the belt downwardly via the roller and guide rail.

10. A method for guiding around a curve of a plastic modular conveyor belt capable of following a path including both straight and curving sections, the belt including a series of connected and serially interdigited elongated molded plastic belt module rows, the rows connected by rods extending transversely to the length of the conveyor belt, each belt module row having a set of first aligned spaced projections or link ends extending in one direction from the row and a set of second aligned spaced projections or link ends extending in an opposition direction, the first and second projections of serially adjacent module rows being longitudinally overlapping and juxtaposed when the modules are connected serially in the conveyor belt by the connecting rods extending through transverse openings in the projections, the transverse openings of one of said sets of spaced projections being longitudinally elongated slotted holes to accommodate lateral curves wherein the module rows become angularly shifted and collapse together at the inside of the curve, with substantially all longitudinal tension in the belt from module to module carried generally at the outside of a curve, and including stationary belt supporting structure supporting the belt for movement, comprising the steps of:

providing on at least some of said belt modules a guide roller mounted generally centrally on the underside of the module, with low-friction bearing means supporting the guide rollers on the modules, driving the conveyor belt in a path including laterally curving sections, and guiding the conveyor belt around each such laterally curving section by a stationary roller guide rail secured to the stationary belt supporting structure and positioned through the curving section of the path of the conveyor belt, with a roller engaging surface of the guide rail spaced away from the inside edge of the belt and positioned to be engaged by the series of guide rollers on the belt, thereby maintaining the belt modules on a prescribed curving path through the curving section and restraining the belt from pulling inwardly relative to the curve, thereby providing for smooth and low-friction traversal of the curving sections by the conveyor belt modules.

11. The method of claim 10, including avoiding contact of the belt module rows with any of said stationary belt supporting structure at the inside of the curving sections.

12. The method of claim 10, further including resisting upward movement of the belt during travel through curving sections by providing a flange on the roller guide rail in a position to be engaged in an upward direction by each of the guide rollers as the belt modules travel around the curving sections.

* * * * *